United States Patent [19]
Howald et al.

[11] Patent Number: 5,898,047
[45] Date of Patent: *Apr. 27, 1999

[54] TIRE WITH OUTER CARBON BLACK REINFORCED RUBBER STRIP FOR STATIC REDUCTION

[75] Inventors: John Alan Howald, Uniontown; Gary Bruce Garber, North Canton; Marc Christopher Nowacki, Uniontown, all of Ohio

[73] Assignee: The Goodyear Tire & Rubber Company, Akron, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/717,739

[22] Filed: Sep. 23, 1996

[51] Int. Cl.⁶ .............................. B60C 11/00; B60C 19/08
[52] U.S. Cl. .................................. 152/209 R; 152/152.1; 152/DIG. 2; 524/493; 524/496
[58] Field of Search ............................ 152/152.1, 187, 152/188, DIG. 2, 209 R, 209 D, 209 B; 524/496, 493

[56] References Cited

U.S. PATENT DOCUMENTS

| 2,267,503 | 12/1941 | Lytle | 301/63 |
|---|---|---|---|
| 2,329,332 | 9/1943 | Bull et al. | 152/330 |
| 2,339,546 | 1/1944 | Hanson | 152/109 |
| 2,342,576 | 2/1944 | Fielding | 152/151 |
| 2,641,294 | 6/1953 | Bridgefield | 152/151 |
| 4,329,265 | 5/1982 | Hallenbeck | 524/496 |
| 4,857,397 | 8/1989 | Mowdood et al. | 524/496 |
| 5,173,135 | 12/1992 | Tokieda et al. | 152/152.1 |
| 5,518,055 | 5/1996 | Teeple et al. | 152/152.1 |
| 5,718,781 | 2/1998 | Verthe et al. | 152/209 R |

FOREIGN PATENT DOCUMENTS

| 0658452 | 6/1995 | European Pat. Off. | B60C 19/08 |
|---|---|---|---|
| 658452 | 6/1995 | European Pat. Off. | |
| 658452A1 | 6/1995 | European Pat. Off. | B60C 19/08 |
| 0681931 | 11/1995 | European Pat. Off. | B60C 19/08 |
| 681931B1 | 11/1995 | European Pat. Off. | B60C 19/08 |
| 0705722 | 4/1996 | European Pat. Off. | B60C 19/08 |
| 705722 | 4/1996 | European Pat. Off. | |
| 0718127 | 6/1996 | European Pat. Off. | B60C 19/08 |
| 718127 | 6/1996 | European Pat. Off. | |
| 0732229 | 9/1996 | European Pat. Off. | B60C 19/08 |
| 732229 | 9/1996 | European Pat. Off. | |
| 0747243 | 12/1996 | European Pat. Off. | B60C 19/08 |
| 747243A1 | 12/1996 | European Pat. Off. | B60C 19/08 |
| 798142A1 | 10/1997 | European Pat. Off. | B60C 19/08 |
| 812710A2 | 12/1997 | European Pat. Off. | B60C 19/08 |
| 838353A1 | 4/1998 | European Pat. Off. | B60C 19/08 |
| 718127A1 | 6/1998 | European Pat. Off. | B60C 19/08 |
| 793507 | 1/1936 | France | |
| 1279913 | 11/1961 | France | |
| 1546488 | 10/1968 | France | |
| 544757 | 4/1942 | United Kingdom | |

OTHER PUBLICATIONS

JP Abstract, JP 61143203A (Yokohama Rubber Co. Ltd) (YOKO).

*Primary Examiner*—Veronica P. Hoke
*Attorney, Agent, or Firm*—Henry C Young, Jr

[57] ABSTRACT

The invention relates to a rubber tire having a rubber tread intended to be ground-contacting which is relative electrically insulating and which has at least one thin, narrow, carbon black reinforced rubber strip integral the outer surface, or face, of said tread, each strip extending laterally across the tread to each of the tire's carbon black reinforced sidewalls.

In one aspect, said outer rubber strip, extends laterally across the outer surface of the tread which is designed to be ground contacting and connects with carbon black reinforced tire sidewalls to provide a path of reduced electrical resistance from the outer surface of the tire tread to the bead portion of the tire carcass and, thereby, such a reduced electrical resistance path from a vehicle to the road surface.

In another aspect, the said rubber tread intended to be ground-contacting, is primarily reinforced with silica.

1 Claim, 4 Drawing Sheets

TIRE WITH OUTER CARBON BLACK REINFORCED RUBBER STRIP FOR STATIC REDUCTION

FIELD

The invention relates to a rubber tire with a quantitative silica reinforced rubber tread having a relatively high electrical resistivity such as, for example, a tread cap which contains only a minimal amount of carbon black reinforcement, with at least one thin, carbon black reinforced rubber strip of substantially less, or lower, electrical resistivity, integral with and positioned on the outer surface of said tread to extend laterally across the tread to each of the tire's two carbon black reinforced sidewalls.

The invention relates to a rubber tire composed of carbon black reinforced rubber carcass and having a rubber tread which is quantitatively reinforced with silica and with a minimal amount of carbon black, if any, and which, in turn, has a thin, integral, laterally positioned rubber outer strip across the outer surface of said tread which contains a quantitative amount of carbon black and a minimal amount of silica, if any.

In one aspect, said narrow outer rubber strip, extends radially across the outer surface of the tread which is designed to be ground contacting and connects with carbon black reinforced tire sidewalls to provide a path of reduced electrical resistance from the outer surface to the tire tread to the bead portion of the tire carcass and, thereby, such a reduced electrical resistance path from a vehicle to the road surface.

BACKGROUND

Pneumatic rubber tires can be prepared with a rubber tread composed of diene-based, sulfur curable, elastomer(s) which can be quantitatively reinforced with silica and a minimal amount of carbon black, if any. The tire tread is designed to be ground-contacting and is usually of a lug and groove or a rib and groove design. Such designs are well known to those skilled in such art.

The tire may also be of a cap/base construction in which the tread cap is the outer portion of the tread designed to be ground-contacting with the associated lugs and grooves and/or ribs and grooves and the tread base underlies the tread cap and is positioned between the tread cap and the supporting tire carcass. Such tire construction is well known to those skilled in such art.

Rubber by itself, without added ingredients, is generally considered as being substantially an electrical insulator or, in other words, a rather poor conductor of electricity.

A carbon black reinforced rubber vehicular tire, while still providing a degree of resistance to flow of electricity, has a considerably higher electrical conductivity, or lower resistance to flow of electricity, than rubber without the carbon black reinforcement.

Silica is, basically, a relatively poor conductor of electricity and thus a substantially silica reinforced rubber tire tread which contains only a minimal amount, if any, of carbon black reinforcement is believed to be a relatively good electrical insulator, particularly as compared to a quantitatively carbon black reinforced rubber tire tread.

Therefore, it is desirable to provide a suitable path of relatively low electrical resistance between the tire bead portion and the tread outer surface for such a tire having a quantitative silica reinforced rubber tread and minimal, if any, carbon black reinforcement.

While the dissipation of generated electrical energy may not be completely understood, it is believed that, in one aspect and insofar as a vehicular tire is concerned, electricity may be transmitted primarily from the metal rim, of steel or aluminum, for example, thence on or through the carbon black reinforced rubber surface of the tire carcass to the outer surface of a carbon black reinforced rubber tread and thence to the ground.

As used herein, the terms "quantitatively reinforced with silica", "quantitative silica reinforced rubber" and the like are generally used in conjunction with a tire tread, and with a rubber tire tread cap, in a tread cap/base construction, which contains about 30 to about 100, sometimes preferably about 30 to about 90 phr, of silica, and which may also optionally contain carbon black in which the carbon black is present in not more than about 30 phr. Often it is preferred that the ratio of silica to carbon black is at least 2/1 and sometimes at least 10/1.

The term "phr" as used herein, and according to conventional practice, refers to "parts of a respective material per 100 parts by weight of rubber". In the description herein, rubber and elastomer are used interchangeably.

In the description herein, the term "vulcanized" or "vulcanizable", may, on occasion, be used interchangeably with the terms "cured" and "curable".

SUMMARY AND PRACTICE OF THE INVENTION

In accordance with this invention, a pneumatic rubber tire is provided composed of two spaced apart beads and a pair of sidewalls, each extending radially outward from each of the said beads together with a supporting carcass and an outer, circumferential, rubber tread designed to be ground contacting positioned over said carcass, wherein the said tread optinaly has miniwings extending laterally outwardly from the tread over a portion of the said sidewalls, wherein the rubber portion of said beads, sidewalls and supporting carcass is carbon black reinforced with at least 40 phr of carbon black, wherein said tread is reinforced with at least about 30 phr of silica and less than about 15 phr of carbon black, an improvement in which at least one thin, narrow, carbon black reinforced, rubber strip is provided which is integral with the outer surface of said tire tread and extends laterally across the face of the tread to connect with (i) the periphery of each of the tire's two sidewalls adjacent to the tread or (ii) each of the tire's two miniwings if tread miniwings are used and alternatively to the periphery of the tire sidewalls; all with the said stip not extending to the said bead portions of the tire; wherein said rubber strip contains at least 40 phr of carbon black and wherein an electrical path is thereby provided (a) from the rubber strip on the face of the tread to the tire sidewalls, (b) through the tire sidewalls and (c) to the outer surface of the tire bead portions.

In practice, the thin, narrow, carbon black reinforced, rubber strip has a vulcanized thickness within a range of about 0.2 to about 1.5, preferably about 0.3 to about 0.9, mm.

In practice, it is preferred that the thin, narrow, strip, positioned laterally across the face of the tread, has a width within a range of about 2 to about 15, preferably about 2 to about 8, cm, with a maximum width of the strip, or the sum of the widths of strips for a multiplicity of strips, being less than 8 and preferably less than 7 percent of the circumference of the tire tread. Therefore, the said strip, or strips, as the case may be, is(are) not a circumferential strip(s) around the entire peripheral outer surface of the tire, but only a small, incremental part of the face of the tread surface.

Further, the said strip does not extend across the entire face of the tire sidewalls but, instead, the sidewalls themselves become an integral and important part of the electrical path provided by this invention.

In a practice of the invention, is preferred that one of said strips is used, although it is envisioned that from one to four or five of said strips may be used as being substantially equally spaced apart around the circumference of the tire tread provided that the total widths of the said strips are less than 8 percent of the circumference of the tire tread.

In further practice of the invention, the said strip is positioned across the face of the quantitatively silica-reinforced tread rubber composition and extends to contact the carbon black reinforced miniwings of the tread or, alternatively, to contact the carbon black reinforced sidewalls of the tire, the contact of the strip being limited to the periphery region of the sidewalls adjacent to the tire tread, all without the strip extending across the entire face of the sidewalls and therefore without extending to the bead region of the tire.

In such manner, the invention is considered to be a significant departure from prior practice, including U.S. Pat. No. 2,339,546 which is directed to a "nonstatic" tire having a strip of electrically conducting, carbon black-containing, rubber composition extending from the face of the tread all the way to a bead portion of the tire. In U.S. Pat. No. 2,339,546, the electrically conductive strip is relied upon to provide a path from the tire bead region to the face of the tread to overcome an electrical resistance in the tire sidewall, whereas in this invention, the electrically conductive strip is relied upon to overcome an electrical resistance in the tread cap itself and to rely upon the carbon black reinforced tire sidewalls to complete the electrical path between the face of the tire tread and the bead region of the tire. Also, the said patent does not contemplate a highly electrically resistive silica reinforced tire tired.

In one aspect, it is sometimes preferable that, for the tire tread, the weight ratio of silica to carbon black, if carbon black is used, is at least about 2/1 and preferably at least 10/1.

In the practice of this invention, as hereinbefore referenced, the tire tread may also include carbon black reinforced miniwings, usually extending from the tread base, and in such case, said thin, carbon black reinforced, rubber strip extends over the outer surface of both the tread and at least a portion of each of the tread's miniwings, and alternately to contact the periphery of the tire sidewalls and without extending to the tire bead region. Therefore, in such case, the said miniwings may also be a part of the said electrical path.

Such tire is vulcanized whereby the said thin, narrow, carbon black reinforced rubber strip is co-vulcanized with, and thus is integral with, the outer surface of said quantitatively silica reinforced tread and wherein said tread has a lug and groove, and/or rib and groove, configuration.

In another aspect of the invention, such tire is provided wherein the sidewalls of the tire carcass extend over a small portion of the circumferential extremities of the sides of the tire tread, with the tread's adherent, thin, carbon black reinforced and co-vulcanized rubber strip is positioned laterally across the outer surface, or face, of the said tread and (i) over at least a portion of the outer surface of at least one of said tire sidewalls or (ii) between said tread and at least one of said tire sidewalls, all without extending to the tire bead region.

The referenced tread components, namely the tread, tread cap, tread base and miniwings are tread components well known to those skilled in such art. For clarification, reference to the accompanying drawings may be made.

The outer thin, narrow, carbon black reinforced, rubber strip is considered to be integral with the outer surface of the rubber tread in a sense that it is co-vulcanized with the tread. Thus, the outer thin rubber strip is not a simple laminate formed by coating a relatively cold tread with a solvent based rubber composition.

By the term "co-vulcanized" it is meant that the aforesaid carbon black reinforced rubber strip and rubber tread cap components are co-vulcanized together with the rubber tire carcass. Such co-vulcanization is well known to those having skill in such art.

In one aspect of the invention, it is desired that the carbon black, particularly for the outer, carbon black reinforced, rubber strip, be suitably electrically conductive for practical purposes, namely for the rubber composition containing the carbon black to have a suitable electrical resistance to suitably dissipate electrical energy as it is generated.

Suitable carbon blacks contemplated for use in this invention are carbon blacks having sufficient surface area demonstrated by a CTAB value in a range of about 40 to about 150. It is recognized that most carbon blacks typically utilized for tire tread reinforcement purposes possess CTAB values which fall within this range. CTAB surface area values and method determination for carbon blacks are well known to those skilled in such art.

In further accordance with this invention, a method of manufacturing a tire is provided which comprises the steps of (A) applying an extruded rubber tread circumferentially onto a tire carcass of carbon black reinforced rubber to form a tire assembly thereof, (B) applying a thin, narrow, carbon black reinforced, rubber strip across the outer surface of the tread to connect with each of the sidewalls of the tire carcass and (C) vulcanizing the resultant assembly in a suitable mold under conditions of elevated temperature and pressure to form a pneumatic tire.

Thus, in practice, a continuous electrical path from the face, or ground-contacting portion, of the silica reinforced tire tread is provided, sequentially, from (i) the aforesaid strip to (ii) the tire sidewalls and then to (iii) the tire bead portion. The electrical path may also include an electrically conductive metal tire rim in contact with the tire bead portion when the tire is mounted on an electrically conductive metal rim.

For the purposes of this presentation, a tire is viewed as being composed of a circumferential tread and supporting carcass therefor. The carcass is viewed as being composed of relatively conventional elements which include but are not limited to carbon black reinforced rubber sidewalls (although a portion of an outer surface of the sidewalls may be colored by an appropriate pigment such as, for example, white titanium dioxide and, thus, not contain carbon black), beads, apex, innerliner and the supporting carcass plies, including fabric reinforced plies. A shoulder region of a tire is considered as being a portion of the tire where its sidewall meets its tread. It is not normally a sharp line of demarcation and its actual position may vary somewhat from tire to tire. The bead portion of the carcass is typically composed of a relatively inextensible bundle of wires which is encased in carbon black reinforced rubber and is designed to contact a metal rim on which the tire itself is mounted to form a tire/rim assembly which itself is conventionally adapted to be mounted on a vehicle, particularly a hub, or wheel, of a vehicle. The rim is typically steel or aluminum, or alloy thereof and is, thus, electrically conductive since the metal is considered as having a very low resistance to flow of electricity. The term "metal", as used herein for the metal rim, is intended to mean electrically conductive metals such as, for example, the aforesaid steel and aluminum rims as would be understood by those having skill in such art.

By the term "carbon black" reinforced, it is meant that the rubber components of the tire carcass rubber which are carbon black reinforced, contain a quantitative amount of carbon black reinforcement, normally at least 30 phr, usually at least about 40 phr, and usually a minimal amount, if any, of silica so that, insofar as the carbon black and silica are concerned, the carbon black is in the majority.

It is acknowledged that, in some tire constructions, carbon black reinforced rubber components such as, for example, components which are sometimes known as chippers and chafers may be positioned in the bead area or region of the tire construction to assist in cushioning the bead component against the metal rim. In the context of this description, a reference to the aforesaid bead component of the tire carcass is intended to include such other associated rubber components unless otherwise indicated, and thereby are a part of the tire carcass.

In practice, as is well known to those having skill in such art, the tire, which may sometimes be referred to as a pneumatic tire, is mounted on the metal rim and air pressure is applied to the cavity enveloped by the metal rim and the pneumatic tire carcass.

The hereinbefore construction elements, or components, of a pneumatic tire and tire carcass, as well as such tire/rim assembly, are also well known to those familiar with such tire art.

It is to be appreciated that conventional tread, and tread cap/base, as the case may be, constructions are typically prepared by an extrusion process where, in the case of a cap/base construction, the cap and base are extruded together to form a unified extrusion. Such tread extrusion processes are well known to those having skill in such art.

It is considered herein that a continuous relatively low electrical resistance path is created between the electrically conductive metal rim of a tire/wheel (tire/rim) assembly to the outer tire tread surface, and thence to the ground via the carbon black reinforced rubber of the tire, including its ground-contacting tread component, for such a tire/rim assembly mounted on a vehicle which is intended to travel over the ground.

In this manner, it is considered herein that potential electrical energy, which may potentially be created by components of or within a moving vehicle as its rotating wheels and associated tire/rim assemblies as they travel over the ground, is dissipated from the rim of a tire/rim assembly on the vehicle to the ground via the carbon black reinforced rubber path of the tire carcass and tread, or tread cap of a tread of a cap/base construction, which tread or tread cap, as the case may be, is normally the outer rubber surface of the tire intended to be ground contacting.

Thus, in one aspect, it is considered herein that the carbon black reinforced rubber of the tire carcass and associated tread normally provide a sufficiently low electrical resistance path to dissipate potential electrical energy and, thereby, retard or eliminate static electrical charge from building up and/or accumulating under dynamic conditions of a rotating tire on a vehicle traveling across the ground.

As hereinbefore pointed out, in practice, carbon black reinforced rubber tires may sometimes be prepared which have outer rubber treads, or tread caps, designed to be ground contacting which are quantitatively reinforced with silica and contain only minimal amounts such as, for example, 15 phr or less, of carbon black.

In such silica reinforced tire tread construction, although the various other rubber components of the tires namely, the aforesaid overall tire carcass, are quantitatively reinforced with carbon black with a minimal amount, if any, of silica and, thus, may have a relatively low electrical resistance on the order of one megohm or less whereas, the silica reinforced tread itself may have a substantially high electrical resistance, or low electrical conductivity, on an order of at least one thousand megohms and, thus, such tread creates a degree of electrical insulating effect between the tire carcass and ground Such a tire construction has substantially less tendency to dissipate static electricity from the tire to the ground, and particularly from the metal rim of a tire/rim assembly to the outer surface of the tire tread and thence to the ground, which may be generated by a dynamic condition of the rotation of the tire on a moving vehicle. Accordingly, a potential for static electricity to build-up, or increase, is considered to be higher for such a tire construction with a silica reinforced tread than for a similar tire with a carbon black reinforced tread.

It is acknowledged that it might be thought of to apply an organic solvent based or water based coating of carbon black-containing rubber composition over the outer surface of the quantitative silica reinforced rubber tread to facilitate a path of relatively low electrical resistance connecting the tire's carbon black reinforced rubber sidewall region to the outer tread surface, and thence the ground as the tire rotates on the vehicle. Indeed, elastomer/carbon black coatings, which may be applied as either water-based or organic solvent-based compositions and which are sometimes called pre-cure paints, are often applied to various surfaces of green, or unvulcanized, tire construction before the tire is vulcanized in a suitable mold. A purpose for such pre-cure paints might be, for example, to reduce friction between the tire and its associated vulcanization mold and increase air bleed between the tire and mold during the vulcanization operation. For example, see U.S. Pat. Nos. 4,857,397 and 4,329,265.

It is recognized that a thin outer rubber coating, if applied to a tire tread surface, will relatively quickly wear away as the tire is used, leaving the coating on surfaces within the grooves in a tire tread which typically has a lug/groove design or configuration. Thereby, it is considered herein that only a very small portion of the coating, namely the thickness of the coating on the walls of the tire tread lugs, is actually available to be directly presented to, or contact, the ground to facilitate a relatively low electrical resistance from the tire to the ground for a tire with tread which is quantitatively reinforced with silica.

It is, therefore, considered herein that in order to be practical, a carbon black reinforced rubber layer over the outer surface of the silica reinforced rubber tread should be a thin, narrow, carbon black-containing rubber layer integral with the tread and, thus, having good adhesion to the tread, particularly within the tire tread grooves including the lug walls, and present a sufficient cross-sectional thickness, or surface area, to the ground of the rubber strip on the walls of the tire tread's lugs to be effective after the said layer wears away from the outer surface of tread lugs.

In one alternative aspect, for a tire tread conventionally configured with a combination of lugs and grooves, it is desired that the grooves connect directly or indirectly with the carbon black reinforced rubber shoulder of the tire, the area of the tire where the sidewall and tread meet, in order for the carbon black reinforced rubber strip to provide a continuous electrical path between the tire's sidewalls across the outer surface of the ground-contacting portion of the tire tread.

In a tire tread cap/base construction, which is well known to those having skill in such art, and for the purposes of this invention, it is envisioned that the cap is substantially silica reinforced and its base is substantially carbon black reinforced.

In practice, it is desirable that the thin rubber on and across the outer surface of the tire tread (i) contains a quantitative amount of carbon black and is of a relatively low electrical resistance, or sufficient electrical conductivity, to aid in dissipation of electrical energy under the aforesaid conditions, (ii) is co-vulcanized with the rubber tire tread in order that it be integral with the tread and the walls of grooves of a tire tread configuration composed of lugs and grooves, (iii) be relatively thin and narrow so that it does not appreciably affect the tread properties of the tread, yet (iv) be thick enough so a cross-section of the layer on the walls of a lug in a tread of a lug and groove configuration can present a suitably low electrical resistance to the ground so that it is not necessary to limit the selection of carbon blacks to carbon blacks with exceptionally low electrical resistance. Indeed, it is expected that a portion of the thin rubber strip will wear off of the outer surface of tire tread lugs during use of the tire so that the cross-section, or thickness, of the thin rubber strip on the tread's lug walls is relied upon to present a path of relatively low electrical resistance from the tread to the ground.

While not limited thereto, various sulfur vulcanizable elastomers and combinations thereof may be used in the construction of various elements of the tire.

Elastomers contemplated are homopolymers and copolymers of conjugated diene hydrocarbons and copolymers of conjugated dienes and aromatic vinyl compounds such as, for example, styrene and alphamethylstyrene. Representative of various dienes are, for example, isoprene and butadiene. Representative of various elastomers are, for example, cis 1,4-polyisoprene (natural and synthetic), cis 1,4-polybutadiene, styrene/butadiene copolymers both emulsion and organic solution polymerization prepared copolymers, isoprene/butadiene copolymers, 3,4-polyisoprene, medium vinyl polybutadiene containing about 30 to about 70 percent vinyl content and styrene/isoprene/butadiene terpolymers.

The co-vulcanized, carbon black reinforced, thin, narrow, rubber strip on the outer surface of the tire tread provides a relatively low path of electrical resistance, as compared to a silica reinforced tire tread and, thus, a path for dissipation of static electricity between the ground and the tire bead portion and thence the metal rim of the vehicular wheel on which the tire may be mounted.

After the tire tread, in service, becomes worn so that the outer, carbon black reinforced, rubber strip is worn away from the outer surface of the lugs of a tire tread having a lug and groove configuration, the path for dissipation of static electricity is maintained by the thickness of the said rubber strip on the walls of the lugs of a tread of a lug/groove configuration.

BRIEF DESCRIPTION OF THE DRAWINGS

The accompanying drawings are provided for further understanding of the invention, although it is not intended that the invention be limited to the presentation of the drawings In the drawings.

Referring to the drawings,

A rubber tire 1 is provided which is composed of (i) a tire carcass 2 having two spaced apart, carbon black reinforced rubber composition bead portions 3 and carbon black reinforced rubber composition sidewalls 4 extending from said beads to the crown of the tire 1 and (ii) an outer, circumferential rubber tread 5 of a cap/base construction composed of a silica reinforced rubber composition tread cap 6 designed to be ground-contacting and an underlying carbon black reinforced rubber composition tread base 7 to support the tread cap 6 and rest on the tire carcass 2. The tire tread 5 also has carbon black reinforced rubber composition miniwings 8 extending laterally outwardly from the tread base 7 onto the shoulder, or periphery, of the tire sidewalls 4 adjacent to the tread.

The rubber tread 5, or tread cap 6 in case of a tread cap/base construction is substantially silica reinforced with about 50 phr of precipitated silica and contains less than 10 phr of rubber reinforcing carbon black and thus is considered herein to be of relatively very high electrical resistance.

The said rubber, or various elastomer compositions, contained in or as a part of said tread base 7, said tread miniwings 8, said sidewalls 4 and bead portions 3 are carbon black reinforced with at least 40 phr of rubber reinforcing carbon black and less than 10 phr of precipitated silica, if any, and thus is considered herein to be of a relatively low electrical resistance as compared to the silica reinforced tire tread.

Figure 1:
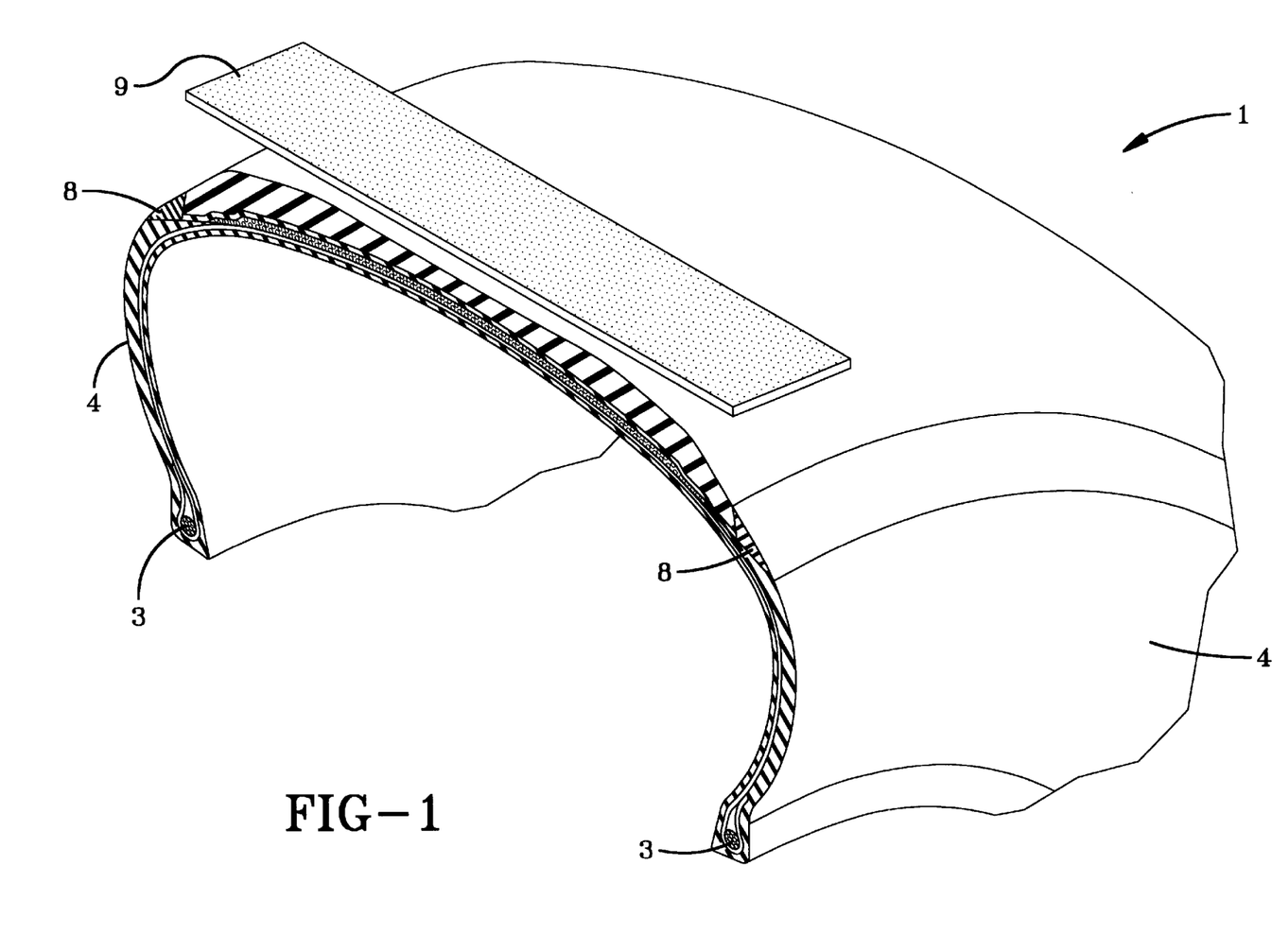
FIG. 1 depicts a cross-sectional, perspective view of an unvulcanized tire, including an assembly of a tire carcass composed of a carbon black reinforced rubber composition (s) of relatively high electrical conductivity, or relatively low electrical resistance and circumferential rubber tread of relatively high electrical resistance, with a thin, carbon black reinforced rubber strip of relatively low electrical resistance positioned above the tire assembly. For example, the said tread of relatively high electrical resistance may be of an elastomer composition reinforced with at least 40 phr of silica and less than 10 phr of rubber reinforcing carbon black.
Figure 2:
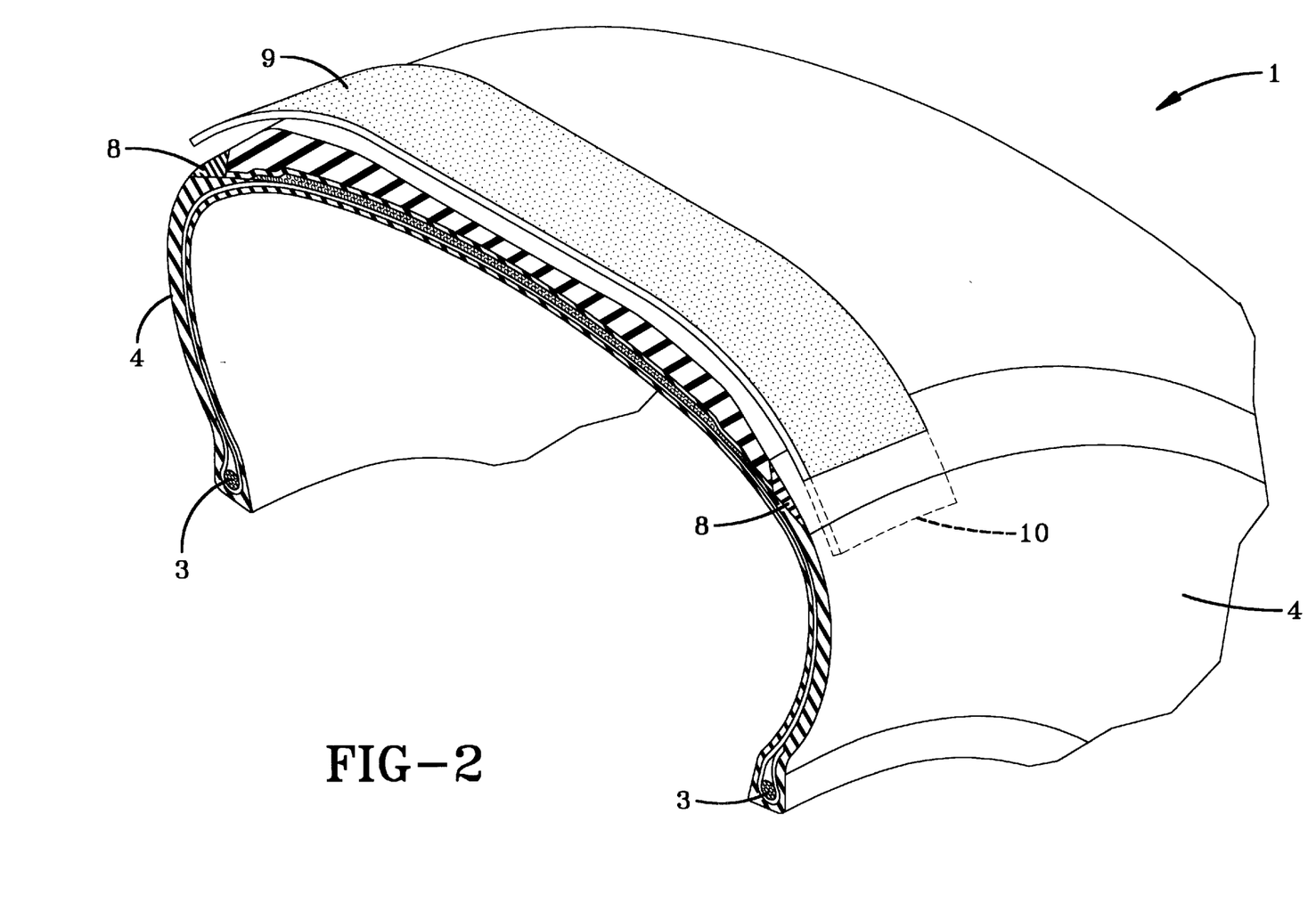
FIG. 2 depicts the cross-sectional, perspective view of the shaped but unvulcanized tire assembly with a single, unvulcanized, thin, carbon black reinforced rubber strip, of relatively low electrical resistance, on the outer surface of the tread and extending laterally across the tread to contact both of the tire tread's miniwings and, alternatively, the tire's rubber sidewalls having a relatively low electrical resistance.

As shown in FIG. 2, a thin, narrow, carbon black reinforced, rubber strip 9 is positioned on the outer surface of the tire tread 5, or tread cap 6 in case of a tread of cap/base construction, to extend laterally across the face of the tread 6 so that the rubber strip contacts at least one of, and preferably both of, the tread miniwings 8 and alternatively extends to the periphery of the sidewalls 7 adjacent to the tread, all without extending to the tire bead portions 3. It is to be appreciated that if the tread 6, or tread cap 7, as the case may be, does not have the miniwings 8, then the said strip 9 extends laterally across the face of the tread to the tread sidewalls 7 such as by abutting or overlapping a portion of the outer surface of the sidewalls 7. With or without the miniwings 8, the strip 9 may, optionally, extend to cover a part of the face of the sidewalls 8 adjacent to the tread to a terminus 10 in a region of the tire usually referred to as a shoulder of the tire.

Figure 3:
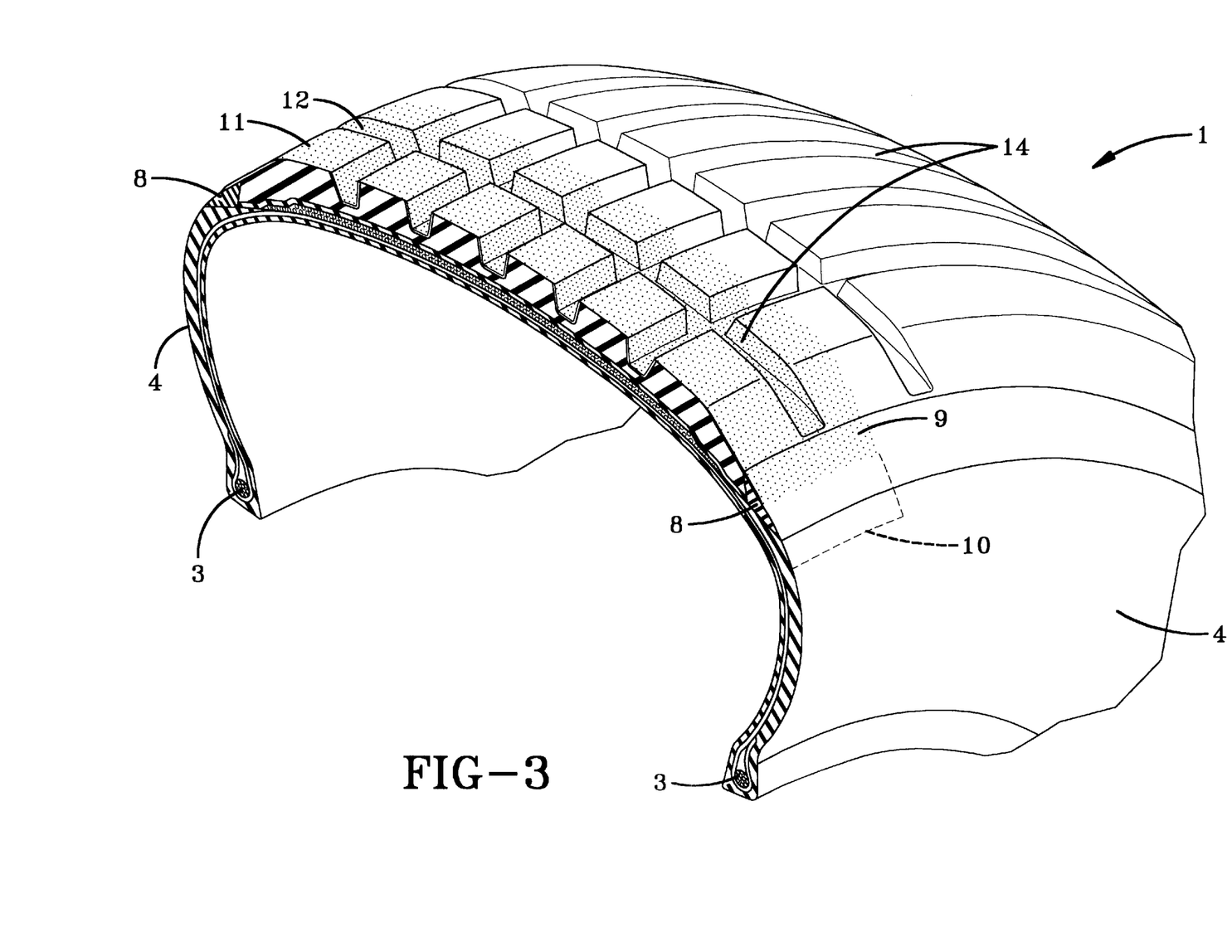
FIG. 3 is a cross-sectional view of the tire of FIG. 2 which has been vulcanized under conditions of elevated temperature and pressure, showing the optional cap/base tread construction, in which the tread's raised lug portions and recessed groove configuration is depicted. The said strip does not contact the tread base and, moreover, does not extend through the tread to any other part of the tire. Further, the said strip does not extend circumferentially around the tire tread but, instead, as hereinbefore set forth, extends laterally across the tire.

The tire construction, as depicted in FIG. 2 with tread 5 built onto the tire carcass 4, together with the thin, narrow, carbon black reinforced, rubber strip 9, is shaped and vulcanized in a suitable mold to form a tire as depicted in FIG. 3 having a tread configured with what is referred to herein lugs 11 and grooves 12. The said thin, narrow, carbon black reinforced, rubber strip 9 which covers an outer surface and walls of the tread's lugs 11 and the bottoms of the grooves 12 extends to and covers at least a portion of the carbon black reinforced rubber of the said miniwings 8 which now overlay a part of the tire sidewall 5 located in the shoulder region of the tire where the tread and sidewalls 5 join.

As the tire 1, having been mounted and inflated on a suitable electrically conductive rigid metal rim, such as, for example, a steel or aluminum rim, the rim itself being mounted on a wheel of a vehicle, a path for electrical dissipation, is created between the rim to the outer surface of the tread 1, and thereby to the ground, by the aforesaid electrically laterally positioned rubber strip 9 which contacts at least one other carbon black reinforced rubber component of the tire.

As the said thin, narrow, carbon black reinforced, rubber strip 9 on the outer, ground-contacting surfaces of the tread lugs 11 wears away to present a part 15 of the underlaying tread 1, or tread cap 6, as the case may be, an electrical path is created by the said strip 9 on the walls of the tread lugs 11, which themselves contact the ground, and further via connecting groove path 14 which extends to the said carbon black reinforced tread miniwings 8 or shoulder 3 of the tire, alternatively to the terminus 10.

In practice, the commonly employed siliceous pigments used in rubber compounding applications are preferably precipitated siliceous pigments (referred to herein as silica).

The siliceous pigments preferably employed in this invention are precipitated silicas such as, for example, those obtained by the acidification of a soluble silicate, e.g., sodium silicate.

The siliceous pigment (silica) should, for example, have an ultimate particle size in a range of 50 to 10,000 angstroms, preferably between 50 and 400 angstroms. The BET surface area of the pigment, a measurement using nitrogen gas, is preferably in the range of about 50 to about 300, preferably about 120 to about 200, square meters per gram. The BET method of measuring surface area is described in the *Journal of the American Chemical Society*, Volume 60, page 304 (1930).

The silica also typically has a dibutylphthalate (DBP) absorption value in a range of about 100 to about 400, and usually about 150 to about 300.

The silica might be expected to have an average ultimate particle size, for example, in a range of about 0.01 to 0.05 micron as determined by the electron microscope, although the silica particles may be even smaller in size.

Various commercially available silicas may be considered for use in this invention such as, for example, only and without limitation, silicas commercially available from PPG Industries under the Hi-Sil trademark with designations 210, 243, etc; silicas available from Rhone-Poulenc, such as, for example, Zeosil 1165MP and silicas available from Degussa AG with designations such as, for example, VN2, VN3, and 3370.

When quantitative silica reinforcement is desired for a rubber tire tread, particulate, precipitated silica is conventionally used with a coupling agent, or what is sometimes referred to as a silica coupler.

Compounds capable of reacting with both the silica surface and the rubber elastomer molecule, in a manner to cause the silica to have a reinforcing effect on the rubber, many of which are generally known to those skilled in such art as coupling agents, or couplers, are often used. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents may, for example, be composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

In one aspect, the silane of the coupling agent apparently forms a bond to the silica surface, possibly through hydrolysis, and the rubber reactive component of the coupling agent combines with the rubber itself.

Numerous coupling agents are taught for use in combining silica and rubber, such as for example, silane coupling agents containing a polysulfide component, or structure, such as bis-(3-triethoxysilylpropyl)tetrasulfide.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typically additions of carbon black, for this invention, if used, are hereinbefore set forth. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the Vanderbilt Rubber Handbook (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from 2 to 2.5, being preferred.

Accelerators are used to control the time and/or temperature required for vulcanization and to improve the properties of the vulcanizate. Retarders are also used the rate of vulcanization. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary or and a secondary accelerator might be used, with the secondary accelerator being used in amounts of about 0.05 to about 3 phr, for example, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur is vulcanizing agent and accelerator(s) are not considered to be an aspect of this invention which is more primarily directed to the use of silica as a reinforcing filler in combination with a coupling agent.

The presence and relative amounts of the above additives are not considered to be an aspect of the present invention which is more primarily directed to a tire with a quantitatively silica reinforced tread having a thin, narrow, integral, carbon black reinforced, rubber strip on the outer surface of the tire tread to provide a path of relatively low electrical resistance, or relatively high conductivity, from the outer surface of the tread to the bead portion of the tread.

The tire can be built, shaped, molded and cured by various methods which will be readily apparent to those having skill in such art.

The invention may be better understood by reference to the following examples in which the parts and percentages are by weight unless otherwise indicated.

EXAMPLE I

Pneumatic rubber tires, identified herein as Tires A, B and C, were prepared of a P205/55R16 type and size. The tires were of a construction, insofar as the tread (tread cap/base construction), miniwings sidewalls and beads, similar to FIG. 2 and FIG. 3. All of the tires had identical carbon black reinforced rubber carcasses with associated carbon black reinforced rubber bead and sidewall components. All of the tires had treads of a cap/base construction with miniwings extending from the tread over the sidewalls. All of the treads had the same surface configuration of lugs and grooves, with the grooves connecting with the tires' sidewalls in the shoulder region. All of the tire treads were composed of a coextruded, quantitatively silica reinforced tire tread cap, carbon black reinforced tread base and carbon black reinforced tread miniwings.

Tire A is a tire with silica reinforced tire tread cap with a lug and groove configuration.

Tire B is similar to Tire A except that its tread has an integral, thin, narrow, carbon black reinforced, rubber strip, about three inches (about 7.6 cm) wide and about 0.015 inches (0.04 cm) thick positioned on the outer surface of the tread cap and extending laterally across the tread (and tread miniwings) to contact the peripheral region of each of the tire's two sidewalls, and without extending to the tire bead portion, in a manner similar to the depiction of FIG. 2 and FIG. 3.

Figure 4:
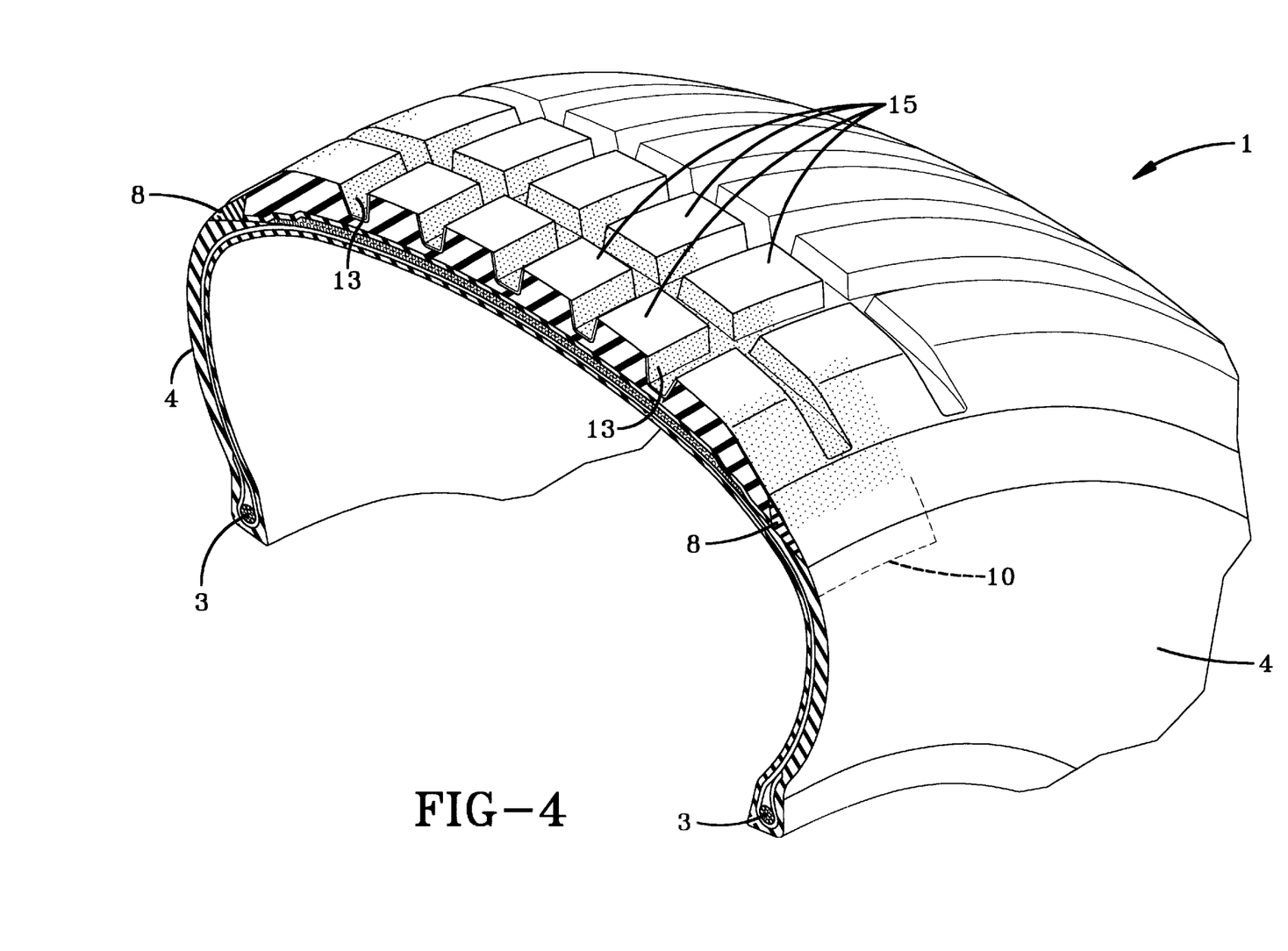
FIG. 4 is a cross-sectional, perspective view of a the tire of FIG. 2 in which a portion of the aforesaid thin, carbon black reinforced, rubber strip on the outer surface of the lug surfaces intended to be ground-contacting is worn, or buffed, away.

Tire C is similar to Tire B except that a portion of the rubber strip has been abraded away from the outer surfaces of appropriate tread lugs to simulate a worn tire tread, to about fifty percent of tread depth of a new tire, similar to FIG. 4.

The compositions for the respective tread cap, tread base and miniwings as well as the thin, carbon black reinforced, rubber strip were comprised of the materials shown in the following Tables 1–3.

The aforesaid extruded treads were suitably built onto the tire carcasses, the thin, carbon black reinforced, rubber strip applied laterally across the outer surface of the tread to contact each of the tire's two miniwings which, in turn contacted the two tire sidewalls and the resulting assembly thereof vulcanized in a tire mold at a temperature of about 160° C. for about 15 minutes to form cured pneumatic tires with tread configurations of lugs and grooves.

The tires were evaluated for their electrical resistance.

TABLE 1

| (Tread Cap) | |
|---|---|
| Non-Productive Mix Stages | |
| E-SBR[1] | 25 |
| Isoprene/Butadiene[2] Rubber | 45 |
| BR[3] | 20 |
| Natural Rubber[4] | 10 |
| Processing Aids[5] | 30 |
| Fatty Acid | 2 |
| Silica[7] | 80 |
| Carbon Black, Tread Type | 0 |
| Coupling Agent[8] | 12 |
| Productive Mix Stage | |
| Sulfur | 1 |
| Zinc Oxide | 4 |
| Antioxidant(s)[6] | 3 |
| Sulfenamide and Thiuram Type Accelerators | 4 |

[1]Emulsion polymerization prepared SBR obtainable from The Goodyear Tire & Rubber Company having styrene contents of about 40 percent.
[2]Isoprene/butadiene copolymer elastomer having a Tg of about −45° C. and an isoprene content of about 50 percent obtained from The Goodyear Tire & Rubber Company.
[3]Cis 1,4-polybutadiene rubber obtained as Budene ® 1207 from The Goodyear Tire & Rubber Company.
[4]Natural rubber (cis 1,4-polyisoprene).
[5]Rubber processing oil as being about 9.4 parts in the E-SBR, where the amount of E-SBR is reported above on a dry weight (without the oil) and in addition, about 14 parts additional rubber processing oil, plasticizers, resins and waxes were added.
[6]Of the di-aryl paraphenylene diamine and dihydro-trimethyl quinoline type.
[7]A silica obtained as Zeopol 8745 from the Huber company.

TABLE 1-continued (Tread Cap)

[8]obtained as bis-3-(triethoxysilylpropyl) tetrasulfide (50% active) commercially available as X50S from Degussa as a 50/50 blend of the tetrasulfide with N330 carbon black (thus, considered 50% active).

TABLE 2

(Rubber Strip)

| Non-Productive Mix Stages | |
| --- | --- |
| E-SBR[1] | 90 |
| Natural Rubber[2] | 10 |
| Processing Aids[3] | 40 |
| Fatty Acid | 2 |
| Carbon Black, N220 | 70 |
| Productive Mix Stage | |
| Sulfur | 1 |
| Zinc Oxide | 4 |
| Antioxidant(s)[4] | 3 |
| Sulfenamide and Thiuram Type Accelerators | 4 |

[1]Emulsion polymerization prepared SBR obtainable from The Goodyear Tire & Rubber Company having styrene content about 23 percent.
[2]Natural rubber (cis 1,4-polyisoprene).
[3]Rubber processing oil as being about 33.8 parts in the E-SBR, where the amount of E-SBR is reported above on a dry weight (without the oil) and in addition, about 11 parts additional rubber processing oil, plasticizers, resins and waxes were added.
[4]Of the di-aryl paraphenylene diamine and dihydro-trimethyl quinoline type.

TABLE 3

(Tread Base and Miniwings)

| Non-Productive Mix Stages | |
| --- | --- |
| BR[1] | 60 |
| Natural Rubber[2] | 40 |
| Processing Aids[3] | 18 |
| Fatty Acid | 1 |
| Carbon Black, N550 | 50 |
| Productive Mix Stage | |
| Sulfur | 2 |
| Zinc Oxide | 4 |
| Antioxidant(s)[4] | 3 |
| Sulfenamide and Thiuram Type Accelerators | 0.6 |

[1]Cis 1,4-polybutadiene rubber obtained as Budene ® 1207 from The Goodyear Tire & Rubber Company.
[2]Natural rubber (cis 1,4-polyisoprene).
[3]Rubber processing oil, plasticizers, resins and waxes.
[4]Of the di-aryl paraphenylene diamine and dihydro-trimethyl quinoline type.

EXAMPLE II

Static electrical resistance measurements were conducted on Tires A, B and C. The results of the tests are shown in the following Table 4.

TABLE 4

| Tire | Electrical Resistance[1] |
| --- | --- |
| A | $190 \times 10^8$ |
| B | $1.6 \times 10^8$ |
| C | $2.2 \times 10^8$ |

[1]Ohms.

These electrical resistance measurements demonstrate that, for a tire with tread of silica reinforced rubber, the application of the thin, integral, carbon black reinforced, rubber strip on the outer surface of the silica reinforced tread cap significantly reduced the electrical resistance of the tire.

In particular, for a tire with a quantitatively silica reinforced tread having an electrical resistance of about $190 \times 10^8$ ohms for Tire A, the application of the thin, integral, carbon black reinforced, rubber strip (i) on the outer surface of the tread for Tire B reduced the electrical resistance of the tire to about $1.6 \times 10^8$ ohms or (ii) over the outer surface of the tread followed by buffing the layer off of the outer surface of the tread lugs for Tire C reduced the electrical resistance of the tire to about $2.2 \times 10^8$ ohms.

In general, the electrical resistance of the tire was determined by (i) mounting the tire on a metal (steel) rim and inflating the tire, (ii) standing the tire with the outer surface of its tread, and particularly the aforesaid carbon black strip extending across the tread to the tire's sidewalls, on a stainless steel plate to which a copper wire (first electrode) is attached, (ii) attaching a copper wire (second electrode), (iii) applying a voltage of 100 volts across the terminals of said first and second electrodes and (iv) measuring the resistance in ohms between the metal rim, and thus the bead portion of the tire, and the metal plate, and thus the outer surface of the said strip across the tread, by an ohmmeter connected across the terminals of said first and second electrodes.

While certain representative embodiments and details have been shown for the purpose of illustrating the invention, it will be apparent to those skilled in this art that various changes and modifications may be made therein without departing from the spirit or scope of the invention.

What is claimed is:

1. In a pneumatic rubber tire composed of two spaced apart bead portions and a pair of sidewalls, each sidewall extending radially outward from each of the said bead portions together with a supporting carcass and an outer, circumferential, rubber tread designed to be ground contacting positioned over said carcass, wherein the said tread has miniwings extending laterally outwardly from the tread and over a portion of the tire sidewalls, wherein the rubber portion of said bead portions, sidewalls, supporting carcass, and tread miniwings, are carbon black reinforced with at least 40 phr of carbon black, wherein said tread is reinforced with at least about 30 phr of silica and less than about 15 phr of carbon black, an improvement in which from one to five thin, narrow, carbon black reinforced, rubber strips are provided which is integral with the outer surface of said tire tread extend laterally across the face of the tread to connect with (i) the periphery of each of the tire's two sidewalls adjacent to the tread or (ii) each of the tire's two miniwings; all with the said strip not extending to the said bead portions of the tire and wherein the said strip does not extend through the tread to any other part of the tire; wherein said rubber strip contains at least 40 phr of carbon black and wherein an electrical path is thereby provided (a) from the rubber strip on the face of the tread to the tire sidewalls, (b) through the tire sidewalls and (c) to the outer surface of the tire bead portions; wherein the width of each of such strips is in a range of about 15 cm and the sum of the widths of said narrow strips is less than eight percent of the circumference of the tire.

* * * * *